July 12, 1932.  C. E. CARPENTER  1,867,307
DOUGHNUT MACHINE AND THE LIKE
Filed Oct. 17, 1931  3 Sheets-Sheet 1

Inventor:
Charles E. Carpenter

July 12, 1932.  C. E. CARPENTER  1,867,307
DOUGHNUT MACHINE AND THE LIKE
Filed Oct. 17, 1931  3 Sheets-Sheet 2

Inventor:
Charles E. Carpenter

July 12, 1932.  C. E. CARPENTER  1,867,307
DOUGHNUT MACHINE AND THE LIKE
Filed Oct. 17, 1931  3 Sheets-Sheet 3
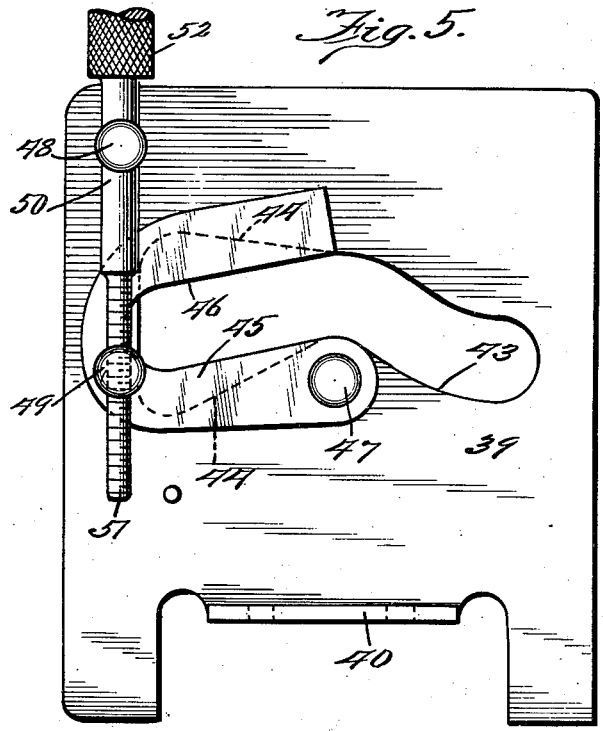
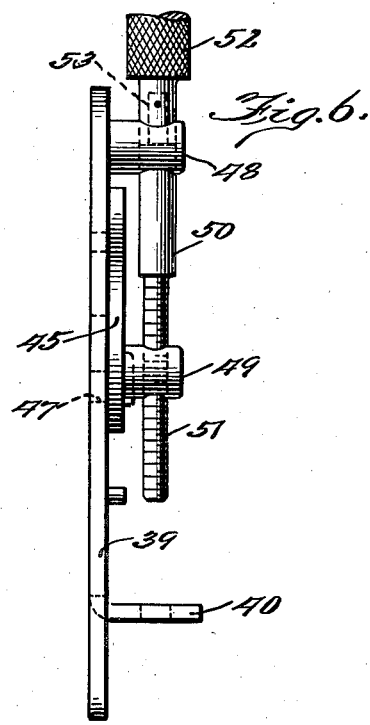
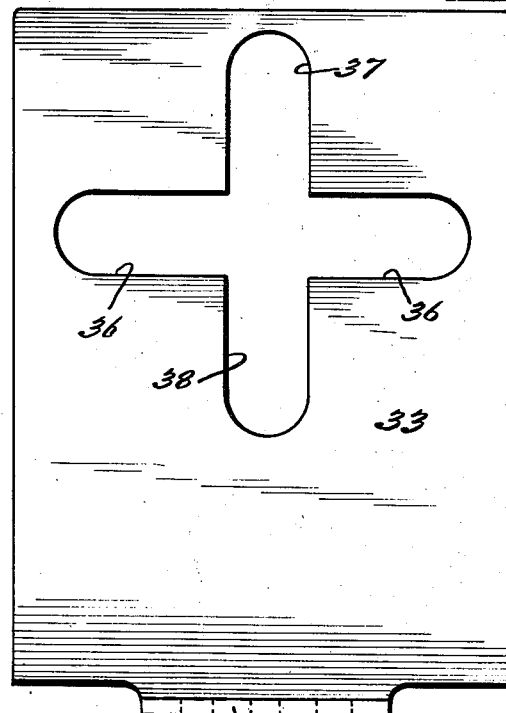
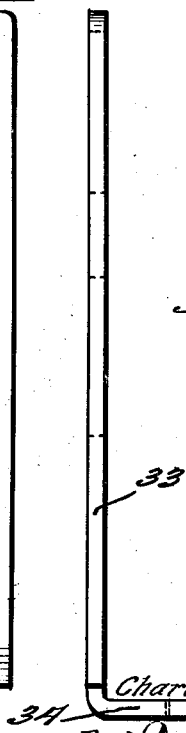
Inventor:
Charles E. Carpenter Patented July 12, 1932

1,867,307

UNITED STATES PATENT OFFICE

CHARLES E. CARPENTER, OF CHICAGO, ILLINOIS

DOUGHNUT MACHINE AND THE LIKE

Application filed October 17, 1931. Serial No. 569,377.

This invention has to do with improvements in doughnut machines and the like. The features of the present invention relate especially to improvements in the means or mechanism for cutting the doughnut forms and delivering them in condition ready to be fried.

One feature of the present invention relates to improvements in that type of doughnut machine in which there are provided plunger and valve devices which reciprocate in or with respect to a delivery throat in communication with a hopper where the dough supply is contained. The plunger and valve mechanisms work up and down in or with respect to this throat in such timed relationship that a fresh charge of dough is drawn in between the plunger and the valve during one portion of the operation, said dough charge or batch being then moved down through the throat to a delivery position, and being finally cut off and perforated by the subsequent movement of the valve device.

The features of the present invention relate to improvements in the means for causing the plunger and valve devices to reciprocate in proper timing; and this mechanism is also so constructed that the relative movements of the valve and plunger device can be adjusted in order to change the size of dough batch which will be drawn in and subsequently delivered as a completed doughnut form.

In connection with the foregoing, it is an object of the invention to provide a very simple construction of operating device, one which is provided with cam tracks for causing the proper relative movements of the valve and plunger devices, and a device which is so constituted that the form of said cam tracks can be readily adjusted in order to change the relative movements of the parts for the purposes already explained.

Another object of the invention is to provide a construction of these devices such that they can be readily made from sheet metal or other parts according to well understood manufacturing operations and at low cost.

Other objects and uses of the invention will appear from a detailed description of the same, which consists in the features of construction and combinations of parts hereinafter described and claimed.

In the drawings:

Figure 3, shows a face view of the cam plate for operating the valve device;

Figure 4 shows a side or edge view corresponding to Figure 3;

Figure 5 shows a face view of the adjustable cam plate for operating the plunger device; and Figure 6 shows an edge view corresponding to Figure 5.

Figure 1:
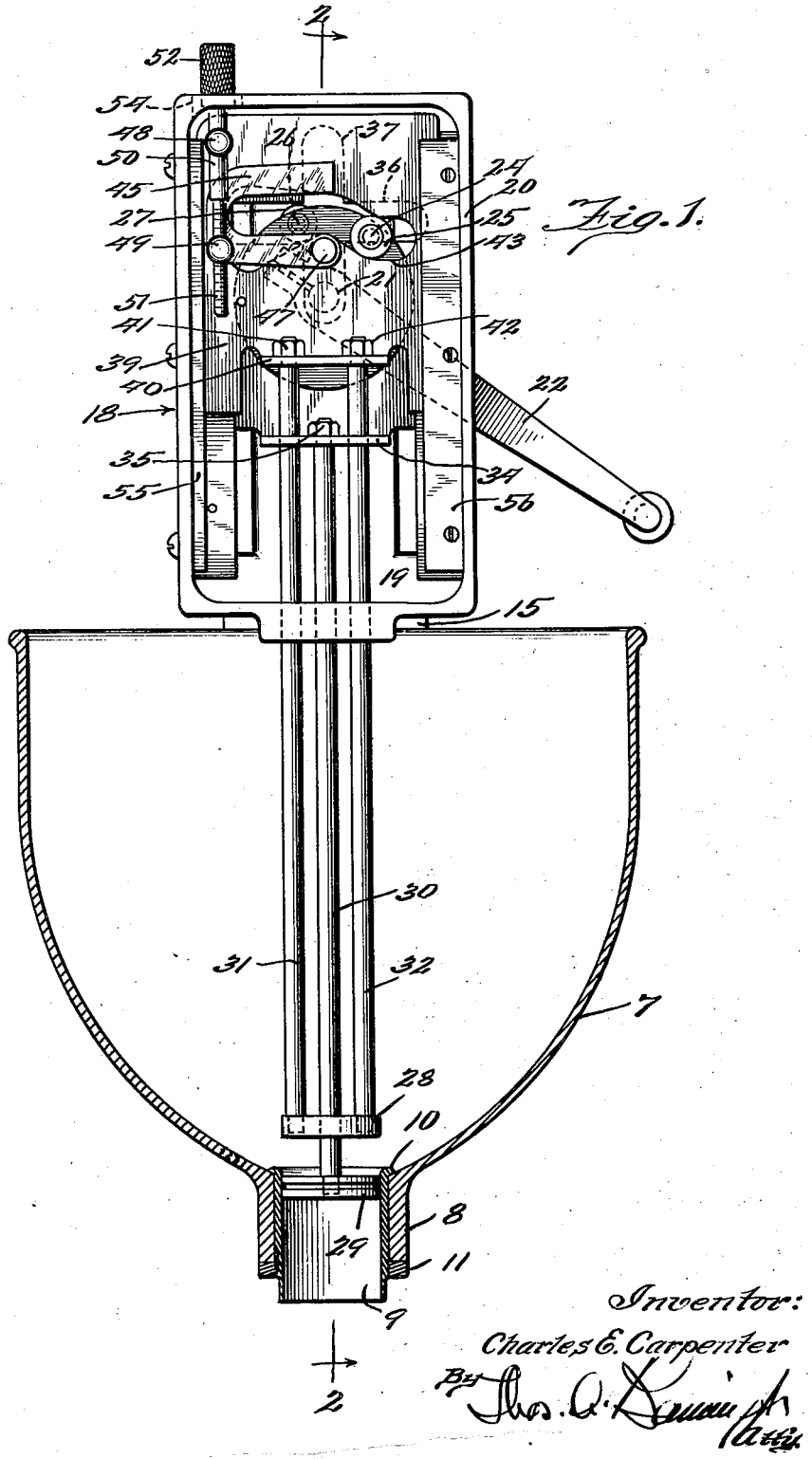
Figure 1, shows a vertical section through a dough hopper, and delivery throat, and operating mechanism, looking directly towards the latter, being a section on the line 1—1 of Figure 2, looking in the direction of the arrows.
Figure 2:
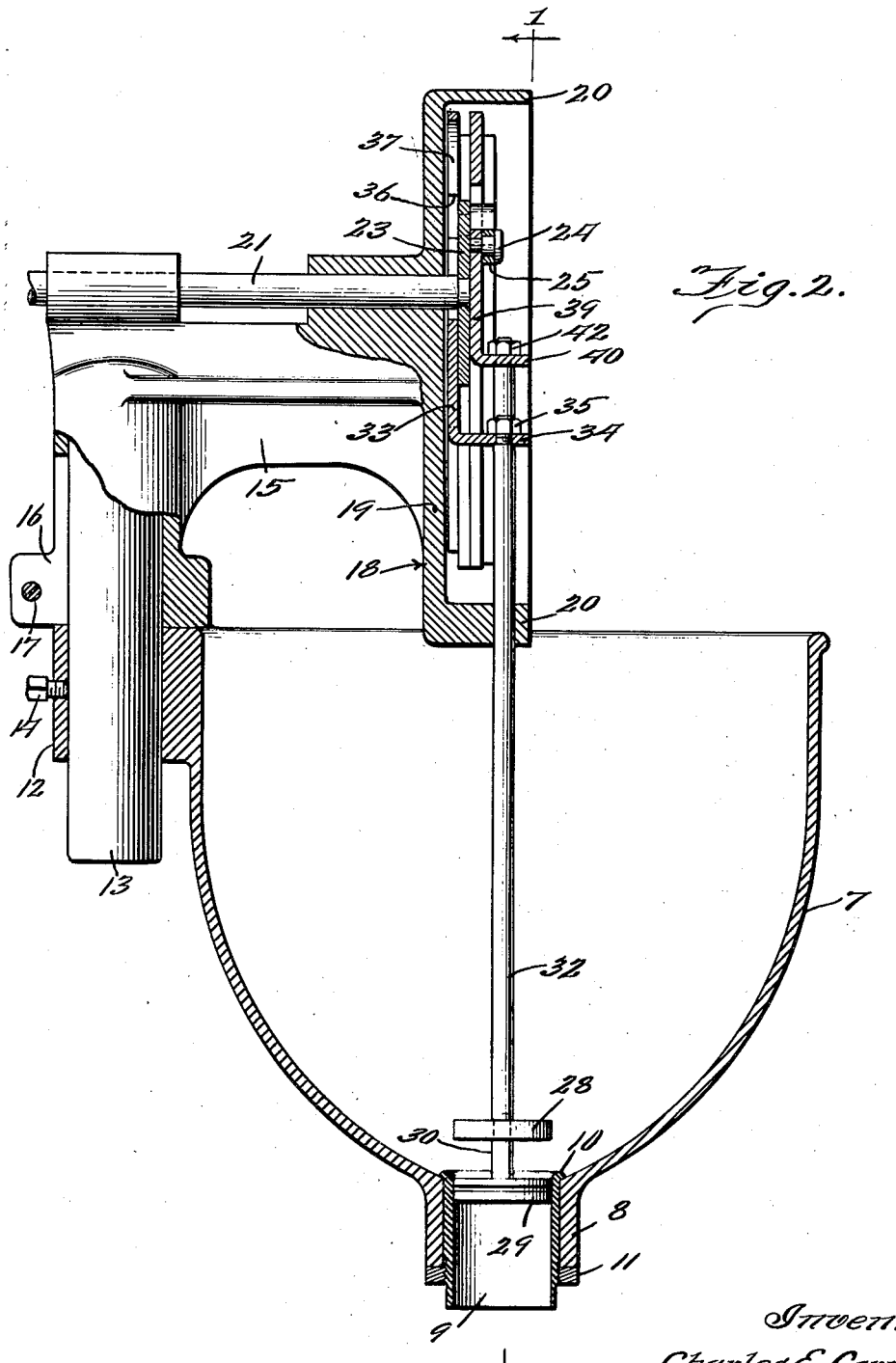
Figure 2, shows a vertical section on the line 2—2 of Figure 1, looking in the direction of the arrows.

In the different figures, the dough hopper is designated in its entirety by the numeral 7. In its lower portion, it is contracted or drawn together and terminates in a downwardly extending throat 8. A liner 9 is set down into said throat, the upper edge of said liner being provided with an outwardly extending flange 10, which seats against the lower portion of the hopper. A lock nut 11 is threaded on to the lower end of the liner and is drawn up against the bottom end of the throat 8, thus securely locking the liner in place.

At one side, the dough hopper 7 is provided with an outwardly extending lug 12. A pin or finger 13 is extended through this lug 12 and may be locked in place by means of a set screw 14. The upper end of this pin carries a bracket member 15, and said bracket member is provided with a split collar portion 16, which embraces the pin 13 and may be locked or clamped thereon by means of a tightening bolt 17. By this arrangement, the bracket 15 can be adjusted up and down with respect to the hopper and it can also be turned laterally.

At its swinging end, the bracket 15 carries a housing 18 in the form of a back plate 19, having an outwardly extending flange 20 to which a cover plate may be connected.

An operating shaft 21 is journaled in the upper portion of the bracket and may be rotated in any convenient manner, such as a crank 22. This shaft reaches into the interior of the housing, where the shaft carries a disk 23. Said disk is provided with a forwardly projecting stud 24 on which is a roller 25, and with a rearwardly projecting stud 26 on which is a roller 27.

There are plunger and valve devices 28 and 29, respectively, which work in the liner 9 of the throat. These plunger and valve devices are of proper size to work nicely in said liner with a piston action as they are reciprocated.

There is an upwardly extending rod 30 connected to the central portion of the valve device 29, and a pair of upwardly extending rods 31 and 32 connected to the plunger device 28 and lying at the sides of the rod 30.

A cam plate 33 is slidably located within the housing 18 between the back wall 19 thereof and the disk 23. The lower end of this cam plate 33 is turned forwardly as shown at 34 to provide a lip to which the rod 30 is connected as by means of the nut 35. This cam plate 33 has a transverse straight cam slot 36 which receives the roller 27 of the stud 26 so that the rotations of the shaft 21 result in a sinusoidal up and down movement of the valve device 29. Incidentally, there are also provided the vertical slot arms 37 and 38 which communicate with the cam slot 36, said vertical slot arms being for accommodation of the shaft 21 which reaches through said slot arms to the disk 23.

There is another cam plate 39 placed in front of the disk 23 and reciprocatingly mounted. The lower portion of this cam plate 39 is provided with an outwardly projecting lug 40 to which the upper ends of the rods 31 and 32 are connected by nuts 41 and 42; and if necessary the lug 34 may be provided with companion perforations through which the rods 31 and 32 freely pass and slide.

The cam plate 39 is provided with the cam slot 43, one end portion of which is enlarged as shown at 44 in Figure 5. There is a U-shaped cam member 45 having a slotted opening 46 of the same size as the slotted opening 43. The member 45 is pivotally connected to the cam plate 39 at the point 47 opposite to the central portion of the cam slot opening. Consequently, the slotted opening 46 constitutes in effect an extension of the cam slot 43, and by turning the member 45 up or down on the pivotal point 47, the shape of the left hand portion of the combined cam slot is modified as may be desired.

There is a stud 48 pivotally connected to the upper corner of the cam plate 39 and another stud 49 is pivotally connected to the swinging portion of the member 46. A pin 50 has its lower portion 51 threaded through the stud 49 and reaching up into the stud 48. A milled or knurled finger piece 52 is connected to the pin 50 as shown at 53 in such a manner as to take against the shoulder formed in the hole which passes through the stud 48. By this arrangement, the milled or knurled finger piece may be turned causing the pin 50 to rotate in the stud 48 but without longitudinal movement therein, thus either drawing the stud 49 up or moving it down and with corresponding adjustment in the position of the member 45. Thus, it is possible by turning the knurled head 52 to change the shape of the cam slot and hold the same in such adjusted shape so that the cam plate will thereafter operate with the cam slot of such adjusted shape.

The roller 25 and pin 24 of the disk 23 work in the cam slot 43 and therefore the up and down movements of the cam plate 39 will conform to the adjusted shape of its cam slot.

As a matter of convenience, the milled or knurled head 52 is allowed to project up through an opening 54 in the top of the housing when the cam plate 39 is in its raised position, as shown in Figure 1, so that the desired adjustments can be made without having to remove the cover plate from the housing.

Suitable guide flanges 55 and 56 are provided in the housing for guiding the edge portions of the cam plates during their vertical movements in the well understood manner.

With this type of device, it will be found that the valve and plunger members may be caused to always reciprocate between the same upper and lower limits of movement, but the amount of separation between them which will be produced will depend upon the adjustment of the member 46. It is thus possible to vary the amount of suction which will be created between the valve and plunger devices in their movements in the throat, and also to vary the size of the dough batch which will be drawn in at each operation.

While I have herein shown and described only a single embodiment of the features of my present invention, still I do not intend to limit myself thereto except as I may do so in the claims.

I claim:

1. In a device of the class described, the combination of a dough hopper, having a downwardly extending throat, plunger and valve devices working in conjunction with said throat, a disk journaled for rotation above the hopper, studs extending outwardly from the opposite faces of said disk, cam plates adjacent to the faces of the disk, connections between the cam plates and the plunger and valve devices respectively, and cam slots in said cam plates engaging the studs aforesaid, one of the cam plates having its cam slot enlarged at one end, a U-shaped member pivotally connected to said cam plate adjacent to said end of the cam slot thereof, said U-shaped member having a cam slot extension registering with the cam slot of said plate, and means for adjusting said U-shaped member with respect to the cam plate to which it is pivoted, sustantially as described.

2. In a device of the class described, the combination of a dough hopper, a downwardly extending throat therein, plunger and valve devices working in said throat, a shaft rotatably mounted above the hopper, a disk carried thereby, studs projecting outwardly from the faces of said disk, cam plates adjacent to the faces of the disk, and connections between said cam plates and the plunger and valve devices respectively, said cam plates being provided with cam slots engaging the studs of the disk, and means for adjusting the forming of the cam slot at one cam plate, effective for engagement by the stud of the disk, substantially as described.

3. In a device of the class described, the combination of a dough hopper, a downwardly extending throat in connection with the same, plunger and valve devices working in said throat, a drive shaft, a disk connected thereto, studs projecting outwardly from the faces of said disk, cam plates adjacent to the faces of the disk, operative connections between the cam plates and the valve and plunger devices respectively, the cam slots in the cam plates receiving the respective studs, one of said cam slots having one end thereof adjustable in the direction of reciprocation, substantially as described.

4. In a device of the class described, the combination of a dough hopper, a downwardly extending throat in connection with the same, plunger and valve devices working in said throat, a drive shaft, a disk connected thereto, studs projecting outwardly from the faces of said disk, cam plates adjacent to the faces of the disk, operative connections between the cam plates and the valve and plunger devices respectively, and cam slots in the cam plates receiving the respective studs, one of said cam plates being provided with a cam slot of adjustable contour, substantially as described.

5. In a device of the class described, the combination of a dough hopper, plunger and valve devices for delivering dough batches therefrom, a pair of cam plates, operative connections between said cam plates and the plunger and valve devices, the cam plates being provided with transversely extending cam slots, and means for adjusting the contour of the outer end portion of one of said cam slots, substantially as described.

6. In a device of the class described, the combination of a dough hopper, plunger and valve devices which deliver dough batches therefrom, a pair of cam plates, operative connections between said cam plates and the plunger and valve devices, the cam plates being provided with transversely extending cam slots, and means for adjusting the contour of one of said cam slots with respect to the contour of the other cam slot, substantially as described.

7. In a device of the class described, the combination of a dough hopper, plunger and valve devices in conjunction therewith serving to deliver dough batches therefrom, a pair of cam plates, operative connections therefrom to the plunger and valve devices, respectively, the cam plates being provided with cam slots, means convenient to the operator for adjusting the contour of one of said cam slots, and means for simultaneously driving both of the cam plates by engagement with their cam slots, substantially as described.

8. In a device of the class described, the combination of a dough hopper, plunger and valve devices in conjunction therewith serving to deliver dough batches therefrom, cam plates, operative connections between the cam plates and the plunger and valve devices respectively, one of said cam plates having a transversely extending cam slot of variable contour, and means for driving the cam plates including a member engaging said slot, substantially as described.

CHARLES E. CARPENTER.